April 13, 1926.

Re. 16,319

W. G. WILSON

HANDHOLE EMERGENCY CAP

Original Filed Dec. 31, 1923

INVENTOR

W. G. WILSON

BY

Wm. L. Morris

ATTORNEY

Reissued Apr. 13, 1926.

Re. 16,319

UNITED STATES PATENT OFFICE.

WILLIAM G. WILSON, OF WEST NEW BRIGHTON, NEW YORK, ASSIGNOR TO E. G. DANIELS, OF NEW YORK, N. Y.

HANDHOLE EMERGENCY CAP.

Original No. 1,526,263, dated February 10, 1925, Serial No. 683,802, filed December 31, 1923. Application for reissue filed May 11, 1925. Serial No. 29,340.

*To all whom it may concern:*

Be it known that I, WILLIAM G. WILSON, a citizen of the United States, residing at West New Brighton, in the county of Richmond and State of New York, have invented new and useful Improvements in Handhole Emergency Caps, of which the following is a specification.

This invention relates to hand hole caps for use in connection with boilers or tanks.

The principal object of the invention is the provision of a safety cap which may be easily applied to the boiler or tank to seal the hand hole without necessitating the removal of the contents of the boiler or tank.

Another object of the invention is to provide a hand hole cap which may be applied to a boiler without the fear of being burned or scalded by escaping steam or water.

With these and other objects in view, the invention resides in certain novel construction and combination and arrangement of parts, the essential features of which are hereinafer fully described, are particularly pointed out in the appended claims and are illustrated in the accompanying drawing, in which:

It sometimes occurs that a leaking hand hole gasket is discovered prior to the sailing of a ship which at present requires that the engineer pull the fire and empty the boiler containing water or steam, and wait until the same is sufficiently cool before repairing the leak. This often delays sailing of ships which is costly in both time and money and it is therefore my intention to provide a cap which may be applied over the hand hole on the exterior of the boiler plate to stop the leak and which cap can be applied while the boilers are filled with their contents. Whereas, I have mentioned one instance in which my invention may be used, it is to be understoood that the same might be used in connection with hand holes for all types and shapes of boilers, or if desired upon man-holes.

Figure 1:
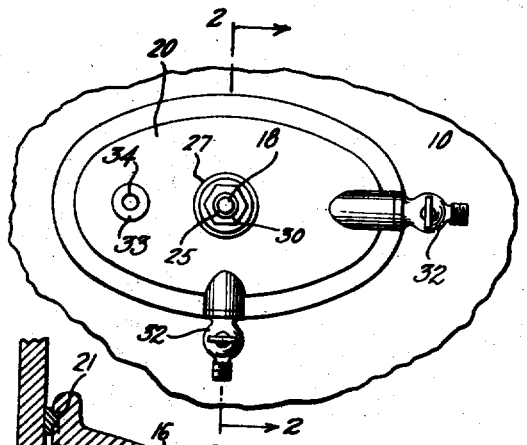
Figure 1 is a front view of my invention applied over a hand hole opening in a boiler.
Figure 2:
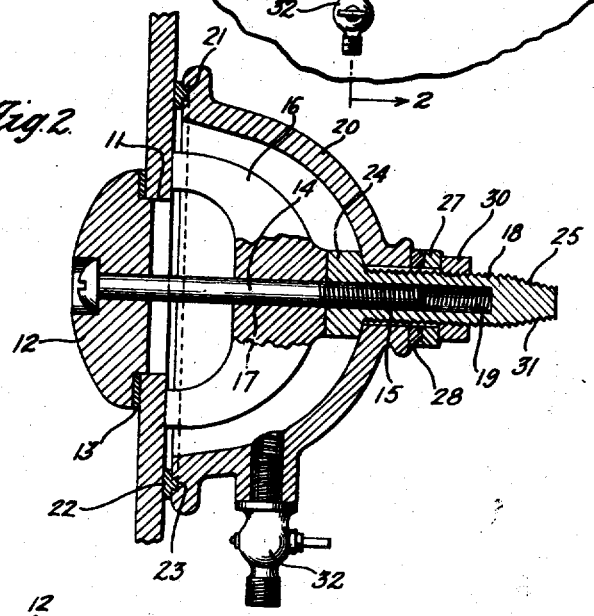
Figure 2 is a vertical sectional view on the line 2—2 of Figure 1.
Figure 3:
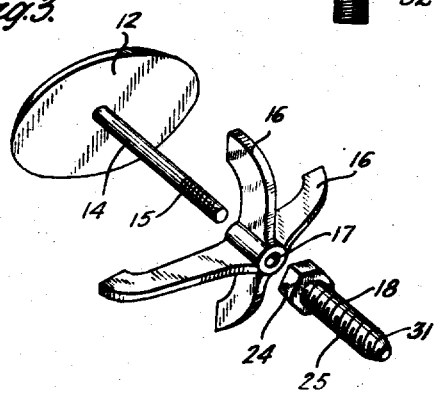
Figure 3 is a detail perspective view of the parts separated.

Referring more particularly to the drawing, the reference numeral 10 designates a hand hole plate of a boiler or tank and has formed therein the usual hand hole opening 11. The opening 11 is closed from the inner side of the boiler by means of a head 12, and a gasket 13 is interposed between the head and the plate 10 to prevent leakage at this particular joint. The head 12 supports a bolt 14 which extends through the opening 11 and projects a considerable distance on the outside of the plate and has its free end screw threaded as at 15. A crow's-foot 16 having a bore 17 therein is insertable on the bolt and abuts the outside of the plate 10 when in position as shown in Figure 2 of the drawing. The crow's-foot 16 is held against the plate adjacent the opening 11 by means of a member 18 which is provided with in internal threaded bore 19 for coaction with the threads 15 on the bolt. The member is adapted to be forced against the crow's-foot to hold the same in clamping engagement with the plate and to likewise bring the head 12 in sealing engagement with the plate whereby a tight joint is produced between the head and the plate to seal the opening 11. In the event that the joint between the head and the plate were to spring a leak, a cap 20 is provided which is of a cup formation. The cap 20 has its peripheral edge formed with a dove-tail groove 21 which receives a gasket 22, having a similar shaped portion 23 for co-action with the groove 21. The member 18 is formed with a nut surface 24 and an externally screw threaded portion 25 over which the cap 20 is passed, the cap having a smooth bore 26 of a diameter to receive the portion 25 of the member. When the cap is moved to its position on the bolt so as to bring the gasket against the plate, a washer 27 is passed over the member and brought against the cap 20. The washer 27 is formed with a gasket 28 which is embedded in the washer in the same manner as the gasket 22 of the cap. This is to prevent leakage through the bore 26, and a nut 30 co-acts with the threads 25 and is brought jamb against the washer so as to hold the cap in sealing engagement with the outside of a plate. The end of the bolt 14 is tapered as at 31, whereby the nut may be easily guided when applying the same.

In order to relieve the pressure of escaping steam or water against the cap when applying the same, I provide the cap with stop-cocks 32 which may be opened to permit the escape of steam or water in a direction away from the person applying the cap. There is also provided a boss 33 in the exterior portion of the cap, the same being formed with a threaded recess 34 for the reception of the threaded end of a length of pipe which may serve as a handle so that the cap may be brought in position while standing a distance from the hand hole plate. The cap may be held in this manner until the clamping action is set up by the application of the nut 30, after which the pipe is removed and the stop-cock shut off.

If desired, the bolt 14 may be extended and the member 18 dispensed with whereupon the washer 27 and the nut 30 are applied directly to the bolt.

From the foregoing description it will be seen that the manner of applying the invention is clearly set forth and a further description is not deemed necessary. It will be noted that the shape of the opening and cap is shown in this instance as an oval in plan, but the same may be of any configuration desired without departing from the spirit of the invention.

The interior of the cap is shown as of oval, bowl like, shape, to conform generally to the outline of a crow's foot for the usual oval hand-hole. This general conformation of the cap to the crow's foot results in the cap being cammed laterally and torsionally, by the crow's foot, automatically to center and seat itself correctly when thrust over the crow's foot to the boiler plate. If the hand-hole and crow's foot are other than oval, the cap may be shaped accordingly, or other means may be provided, so that the same automatic positioning of the cap may be obtained. The taper on the end of the threaded piece 25 in entering the central opening in the cap assists in centering the latter.

The gasket 22 in addition to sealing the joint at the face of the boiler, also serves to prevent that adhesion, welding or "freezing" of the cap 20 to the boiler which might otherwise result from the high temperature, sometimes red heat, of the boiler plate.

Having thus described my invention, what I claim as new and desire to secure by Letters Patent, is:

1. In a device of the character described, a plate having a hand-hole opening therein; means for sealing the opening, including a head on the inside of the plate, means connected to the head to act as a brace for the head against the outside of the plate; and an emergency cap set against the outside of the plate over the brace, said cap being of a construction to form a steam-tight closure for the hand-hole when so set to the plate, and being thus placeable, and securable in place while the brace, and connections therefrom to the head, remain undisturbed, for temporarily stopping a leak through the opening.

2. In a device of the character described, a plate having a hand-hole opening therein; means for sealing the opening, including a head on the inside of the plate, means connected to the head to act as a brace for the head against the outside of the plate; and an emergency cap set against the outside of the plate over the brace, said cap being of a construction to form a steam-tight closure for the hand-hole when so set to the plate, and being thus placeable, and securable in place while the brace, and connections therefrom to the head, remain undisturbed, for temporarily stopping a leak through the opening; the emergency cap being shaped automatically to center itself on its seat against the outside of the plate when thrust against the plate.

3. In a device of the character described, a plate having a hand-hole opening therein; means for sealing this opening, including a head on the inside of the plate, a crow's foot or the like set against the outside of the plate over the opening, a bolt connecting the head to the crow's foot through the opening; and a cup, having a gasket set into its rim to form a steam-tight joint with the plate, inverted over the crow's-foot and set against the plate, said cup being placeable and securable in position while the crow's foot and bolt remain undisturbed, for temporarily stopping a leak through the opening.

4. In a device of the character described, a plate having a hand-hole opening therein; means for sealing this opening, including a head on the inside of the plate, a crow's foot or the like set against the outside of the plate over the opening, a bolt connecting the head to the crow's foot through the opening; and a steam-tight cup inverted over the crow's-foot with its rim against the plate, and forming with the plate a holding chamber for any steam which may leak through the hand hole opening after the cup is set, and means whereby the cup may be thus positioned and secured in place without disturbing the crow's-foot or bolt; for temporarily stopping a leak through the opening.

5. An emergency cap for leaky hand-hole heads or the like, in boiler or other plates, in the form of a cup adapted to be inverted over the fixed supports for the hand-hole head, and to be set with its rim to the plate, said cup being apertured so that, in placement thereof, it may be slipped over and receive a projecting part of such fixed supports, and means for attaching the cap to such projecting part without disturbing the latter.

6. A steam-tight emergency cap adapted to be set on the outside of a boiler or other chamber, over fixed supports for a hand-hole head, to stop a leak through the hand-hole, means for securing the cap in place while said supports remain undisturbed, and means on the cap to receive a rod whereby the operator, at a safe distance from the hand-hole, may set the cap in place.

7. A steam-tight emergency cap adapted to be set on the outside of a boiler or other chamber, over fixed supports for a hand-hole head, to stop a leak through the hand-hole, means for securing the cap in place while said supports remain undisturbed, and a cock at an angle on the cap for directing escaping steam or gas away from the operator while the cap is being positioned.

8. An emergency cap for leaky hand-hole heads, or the like, in boiler or other plates, in the form of a cup adapted to be inverted over the fixed supports for the hand-hole head, and to be set with its rim to the plate, said cup being apertured so that, in placement thereof, it may be slipped over and receive a projecting part of such fixed supports, and means for attaching the cap to such projecting part without disturbing the latter, said cup being adapted to form with the boiler plate a steam-tight chamber for any fluid which may pass the head after the emergency cap is secured in place.

9. A steam-tight emergency cap adapted to be set on the outside of a boiler or other chamber over a crow's foot and bolt for a hand-hole head; the cap being bowl-shaped to receive the crow's foot and having an opening for axial registration with the bolt, and means connectible to the bolt from the outside of the cap for locking the cap in place and for sealing the opening against the escape of steam from the interior of the cap; temporarily to stop a leak, without disturbing or loosening the crow's foot or bolt which are holding the hand-hole head.

10. In a device of the character described, a plate having a hand-hole opening therein; means for sealing this opening, including a head on the inside of the plate, a crow's-foot or the like set against the outside of the plate over the opening, a bolt connecting the head to the crow's-foot through the opening and having a tapered or conical extension pointed outward from the plate; an emergency cap in the form of a cup inverted over the crow's-foot with its rim set against the plate and forming a steam-tight joint with the latter, the cap having an opening to receive the tapered extension of the bolt and to be thereby cammed to centered position, and means connectible to the bolt from the outside of the cap for locking the cap in place and for sealing the opening in the cap against the escape of steam therethrough; the cap being placeable, and lockable in place, without disturbing the crow's-foot or bolt, and when in place forming with the plate a steam-tight chamber for any steam which may leak past the head.

11. A steam-tight emergency cap adapted to be set on the outside of a boiler or other chamber, over fixed supports for a hand-hole head, to stop a leak through the hand-hole, means for securing the cap in place while said supports remain undisturbed, and a threaded boss on the cap to receive a rod whereby the operator, at a safe distance from the hand-hole, may set the cap in place.

12. A steam-tight emergency cap adapted to be set on the outside of a boiler or other chamber, over fixed supports for a hand-hole head, to stop a leak through the hand hole, means for securing the cap in place while said supports remain undisturbed, and a valve for relieving the pressure of steam against the cap while the cap is being set and secured.

13. In a device of the class described, the combination with a plate having a hand hole opening therein, means for sealing said opening from the inside of said plate, including a head, a gasket interposed between said head and said plate, a bolt extending from said head and through said opening, a crow-foot, a member threaded on said bolt and contacting with said crow-foot to hold the same and said head in clamping engagement with said plate, a cap slidable over said member, and means co-acting with said member for forcing said cap in sealing engagement with the exterior of said plate without disturbing the adjustment of said member.

14. In a means for sealing the hand hole opening of a boiler plate including a head on the inside of the plate; means connected to the head to act as a brace for the head against the outside of the plate; a steam-tight emergency cap placeable against the outside of the plate over the brace, and securable in place while the brace, and connections therefrom to the head, remain undisturbed, for temporarily stopping a leak through the opening; and a gasket between the emergency cap and the plate for preventing adhesion of the cap to the plate.

15. A steam-tight emergency cap adapted to be set on the outside of a boiler or other chamber, over fixed supports for a hand-hole head, and carrying a gasket for contact with the heated boiler plate, for sealing the joint between the cap and the boiler-plate, and for preventing adhesion of the cap to the boiler-plate.

16. A steam-tight emergency cap adapted to be set on the outside of a boiler or other chamber, over fixed supports for a hand-hole head, and having a gasket set peripherally into the same for contact with the heated boiler-plate, for sealing the joint between the cap and the boiler-plate, and for preventing adhesion of the cap to the boiler-plate.

17. In a means for sealing the hand-hole opening of a boiler, a head, a bolt extending from said head and through said opening, a crow-foot on said bolt, a member threaded on said bolt for forcing said crow-foot and head into clamping engagement with said plate, an external threaded portion formed on said member, in combination with a cap adapted to be applied over the outside of said hand hole opening upon the leaking of said means having a smooth bore therein insertable over said member, a washer having a gasket thereon for coaction with said cap, and a nut for co-action with the threads on said member for holding the cap in sealing engagement with the plate and the washer in sealing engagement with said cap.

WILLIAM G. WILSON.